United States Patent [19]
Wunderlich et al.

[11] Patent Number: 5,582,005
[45] Date of Patent: Dec. 10, 1996

[54] EXHAUST ARRANGEMENT FOR A GASOLINE

[75] Inventors: Klaus Wunderlich; Stefan Pischinger, both of Waiblingen; Bernd Krutzsch, Denkendorf; Martin Bechtold, Stuttgart, all of Germany

[73] Assignee: Daimler-Benz AG, Germany

[21] Appl. No.: 448,985

[22] Filed: May 24, 1995

[30] Foreign Application Priority Data

May 24, 1995 [DE] Germany ............... 44 18 117.5

[51] Int. Cl.$^6$ .................................................. F01N 3/16
[52] U.S. Cl. ........................... 60/297; 60/275; 60/301
[58] Field of Search ........................ 60/301, 297, 311, 60/275

[56] References Cited

U.S. PATENT DOCUMENTS 3,950,944  4/1976  Shidahara et al. .................. 60/301

FOREIGN PATENT DOCUMENTS

| 0458217 | 11/1991 | European Pat. Off. . |
| 0581279A2 | 2/1994 | European Pat. Off. . |
| 3807907A1 | 10/1988 | Germany . |

OTHER PUBLICATIONS

Patent Abstract of Japan for JP 58-143,113 dated Aug. 25, 1983.
Patent Abstract of Japan for JP 61-242,622 dated Oct. 28, 1986.
European Search Report dated Oct. 9, 1995.

*Primary Examiner*—Leonard E. Heyman
*Attorney, Agent, or Firm*—Evenson, McKeown, Edwards & Lenahan

[57] ABSTRACT

The invention relates to a gasoline engine having a catalyst for reducing the emission pollutants, with an oxygen absorption device located in the exhaust line upstream of the catalyst. According to the invention, the gasoline engine is operated in a first operating range with a lean air/fuel ratio ($\lambda$), and oxygen is removed from the exhaust by the absorption device. In a second operating range, the gasoline engine is operated at $\lambda=1$, and the absorption device is bypassed or deactivated. In the case of a gasoline engine with a Denox catalyst the gasoline engine is operated constantly with a lean air/fuel ratio, with the active surface of the Denox catalyst being "depoisoned" temporarily by activating the oxygen absorption device.

6 Claims, 1 Drawing Sheet

EXHAUST ARRANGEMENT FOR A GASOLINE

BACKGROUND AND SUMMARY OF THE INVENTION

The invention relates to a gasoline engine with an exhaust catalyst for reducing the emission of pollutants.

Operation of gasoline engines with a lean air/fuel mixture in order to reduce fuel consumption is known. In this manner, fuel savings of up to 10% can be achieved in the lower partial load range. As a result of the oxygen surplus in the exhaust during lean operation, however, the three-way catalyst can no longer maintain its function of reducing the oxides of nitrogen contained in the exhaust by residual hydrocarbons. In Denox catalysts the oxygen surplus can result in poisoning of the active catalyst surface, considerably reducing the conversion rate.

German patent document DE-OS 38 07 907 discloses an arrangement in which an oxygen absorption device is located in the exhaust line of an internal combustion engine upstream from the three-way catalyst to reduce the oxygen component in the exhaust, adsorbing or desorbing oxygen from the exhaust line as a function of the partial pressure. This arrangement affects the composition of the exhaust gas because of its buffer action, with the oxygen component contained in an oxygen rich exhaust being reduced. It is not feasible, however, to use this device to regulate the oxygen content in the exhaust directly as a function of the operation of the internal combustion engine. It is impossible to operate the gasoline engine in different ranges of the air/fuel mixture without considerably adversely affecting the functional ability of the catalyst.

A gasoline engine with an $NO_x$ absorption device is disclosed in European patent document EP-0 581 279 A2, in which the oxides of nitrogen are adsorbed in a lean operating range following oxidation on a platinum surface. The oxygen content of the exhaust is reduced by this oxidation. However, these oxides of nitrogen are returned to the exhaust later, so that the air/fuel mixture ratio must be increased to the point where the percentage of unburned hydrocarbons is sufficient to reduce them.

One object of the present invention is to provide an improved gasoline engine with a catalyst, that reduces fuel consumption without adversely affecting the release of pollutants.

This object is achieved according to the invention by providing an oxygen removal device that can be activated or deactivated by a control device, and which not only buffers the oxygen from the exhaust on an intermediate basis but actually removes it from the exhaust line. In this manner, it is possible to regulate exhaust composition in different operating modes of a gasoline engine. Under full load, the gasoline engine can be operated in the conventional manner, with the air/fuel ratio being regulated to a value in the range $\lambda=1$ and the oxygen removal device being deactivated. In the partial load range the gasoline engine is switched to a lean air/fuel ratio, and the oxygen removal device is activated, thus achieving a considerable fuel saving. In the exhaust, a composition corresponding to operation at $\lambda=1$ is achieved by oxygen removal, so that no deterioration of the pollutant emission is produced (in contrast to a conventional gasoline engine with a three-way catalyst).

When a Denox catalyst is used, it is possible to operate the gasoline engine constantly with a lean air/fuel ratio. If poisoning phenomena occurs because of an oxygen surplus in the catalyst, the oxygen removal device can be activated briefly and the catalyst surface reduced again as a result.

Other objects, advantages and novel features of the present invention will become apparent from the following detailed description of the invention when considered in conjunction with the accompanying drawings.

DETAILED DESCRIPTION OF THE DRAWINGS

Figure 1:
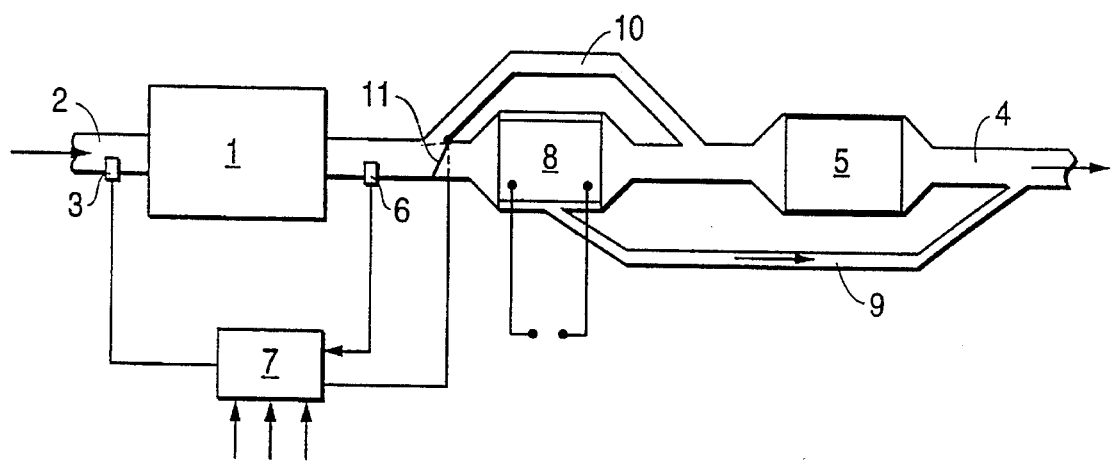
FIG. 1 is a schematic diagram of a gasoline engine according to the invention with a three-way catalyst.

Referring to FIG. 1, the gasoline engine 1 is charged with an air/fuel mixture through an intake line 2, in which an injection device 3 is provided. After combustion of the air/fuel mixture in a combustion chamber of the gasoline engine (not shown), the resultant exhaust is released into the environment through an exhaust line 4 with a three-way catalyst 5. To regulate the air/fuel ratio $\lambda$, a lambda sensor 6 located in exhaust line 4 upstream from three-way catalyst 5 delivers a signal characterizing the air/fuel ratio $\lambda$. Depending on this signal and other operating parameters, regulating device 7 controls the volume of fuel injected by injection device 3.

An oxygen removal device 8, provided in exhaust line 4 between $\lambda$ sensor 6 and three-way catalyst 5, is connected by an exhaust line 9 with exhaust line 4 downstream from three-way catalyst 5. In addition, a bypass channel 10 is provided, which branches off from exhaust line 4 between $\lambda$ sensor 6 and oxygen removal device 8, and rejoins it between oxygen removal device 8 and three-way catalyst 5. A control device 11, in the form of a bypass valve, is provided in exhaust line 4 in the area of the branching of bypass channel 10, to guide the exhaust. With the aid of this control device 11, the exhaust can be conducted either through oxygen removal device 8 or through bypass channel 10. Control device 11 can be controlled by regulating device 7 or by a separate control device.

In this embodiment, oxygen removal device 8 is designed as a Nernst cell, based on the principle of electrolisis, with the oxygen being removal from the exhaust by applying a voltage. For this purpose, the oxygen absorption device 8 is connected with the vehicle battery (not shown), or with another voltage source.

During operation of gasoline engine 1, the signal from lambda sensor 6 is compared with a setpoint for air/fuel ratio $\lambda$ based on the operating engine parameters, and the volume of the fuel supplied by injection device 3 is adjusted accordingly. The operation of the gasoline engine is divided into at least two operating ranges. In the first operating range (which preferably includes the partial load range), a suitable setpoint with a lean air/fuel ratio (for example $\lambda=1.4$) is specified. At the same time, bypass valve 11 is closed (broken line in FIG. 1) by regulating device 7, so that all of the exhaust flows through oxygen removal device 8. Oxygen removal from the exhaust by the voltage applied to oxygen removal device 8 is carried off through an exhaust line 9, and fed back into exhaust line 4 again downstream from three-way catalyst 5. Oxygen absorption device 8 is designed so that three-way catalyst 5, despite the lean operation, is supplied with an exhaust whose composition corresponds to that for operation at $\lambda=1$. As a result complete functional ability of the three-way catalyst can be ensured even in this first operating range.

In theory, this first operating range can also include the cold starting. The three-way catalyst and the Nernst cell however attain their full functional ability only after their operating temperatures have been reached. In order to ensure rapid warming of the three-way catalyst and the Nernst cell, the gasoline engine can be operated during a cold start with an air/fuel ratio in the range of $\lambda=1$.

When the gasoline engine leaves the first operating range in the full-load direction, a new setpoint for the air/fuel ratio in the range from $\lambda=1$ is specified by regulating device 7, and at the same time bypass valve 11 is opened, so that all of the exhaust flows through bypass channel 10 past oxygen removal device 8 to three-way catalyst 5. Since the concentrations of oxides of nitrogen and hydrocarbons in the exhaust are roughly the same at $\lambda=1$ and $\lambda=1.4$, the three-way catalyst 5 is constantly operated in the optimum efficiency range. In order to reduce sudden load variations when making the transition from the first to the second operating range, the ignition is briefly retarded. Diverting the exhaust has the additional advantage that the thermal load on oxygen removal device 8 under full load is reduced while simultaneously reducing the exhaust back pressure. In the partial load range, the small increase in back pressure caused by oxygen removal device 8 causes only insignificant problems as far as fuel consumption is concerned, while total emissions are reduced even further.

Figure 2:
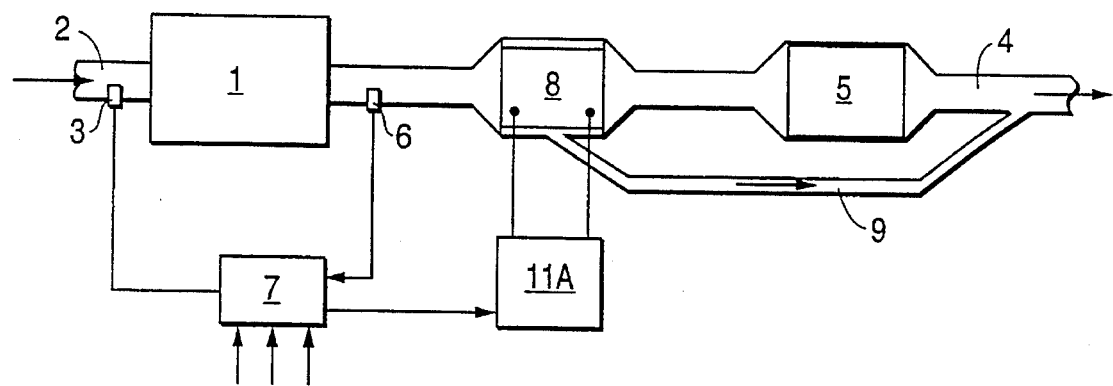
FIG. 2 shows another embodiment of a gasoline engine according to the invention.

FIG. 2 shows another embodiment, with the same parts being marked by the same reference numerals. In contrast to FIG. 1, in this arrangement bypass channel 10 is omitted, and the oxygen removal device 8 is activated and deactivated by a control device 11 that connects or disconnects oxygen removal device 8 to or from the voltage supply.

It is also possible with this arrangement, instead of using three-way catalyst 5, to use a Denox catalyst so that gasoline engine 1 is then constantly operated with a lean air/fuel ratio. The only exception is the full-load range in which the engine can be operated with an air/fuel ratio in the range of $\lambda=1$ to deliver increased power. With lean engine operation, as a result of excess air in the exhaust, there is a risk of poisoning the active surface of the Denox catalyst, which would decrease the Nox conversion rate. Therefore whenever the Nox conversion rate of Denox catalyst 5 drops to an insufficient value as a result of oxygen poisoning of the catalyst material, oxygen removal device 8 is activated briefly. As a result, the oxygen is removed from the exhaust and the catalyst material is reactivated by reduction. When catalyst 5 again achieves a satisfactory conversion rate, oxygen absorption device 8 can be deactivated once again.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Exhaust arrangement for a gasoline engine having a regulating device for controlling an air/fuel ratio of said engine, which regulating device sets a lean air/fuel ratio when said engine is in a first operating range, and sets an air/fuel ratio of approximately 1.0 in a second operating range, said exhaust arrangement comprising:

a main exhaust line;

a three-way catalyst arranged in said main exhaust line;

an oxygen removal device arranged in said main exhaust line upstream of the three-way catalyst;

a bypass exhaust line coupled to said oxygen removal device for carrying a flow of removed oxygen therefrom, bypassing said three-way catalyst; and control means responsive to an output from said regulating device for activating said oxygen removal device when said regulating device sets a lean air/fuel ratio, and for deactivating said oxygen removal device when said regulating device sets an air/fuel ratio of approximately 1.0.

2. Exhaust arrangement according to claim 1 wherein said control means comprises:

a bypass channel connected in parallel with said oxygen removal device; and a bypass valve arranged in said main exhaust line for controlling a flow of exhaust gas through said bypass channel and said oxygen removal device;

wherein said bypass valve directs said flow of exhaust gas through said oxygen removal device when said engine is in said first operating range, and diverts said flow of exhaust gas through said bypass channel when said engine is not in said first operating range.

3. Exhaust arrangement according to claim 1 wherein:

said oxygen removal device operates on the principle of electrolysis; and the control means, in the first operating range, activates the oxygen removal device by applying an electrical voltage, and otherwise deactivates it.

4. Exhaust arrangement according to claim 1 wherein the regulating device sets a lean air/fuel ratio in a partial load range.

5. Exhaust arrangement according to claim 1 wherein the bypass exhaust line connects the oxygen removal device with the main exhaust line downstream from catalyst.

6. Exhaust arrangement according to claim 1 wherein said oxygen removal device comprises a Nernst cell.

* * * * *